United States Patent
Butzmann

(10) Patent No.: US 10,411,614 B2
(45) Date of Patent: Sep. 10, 2019

(54) METHOD AND CIRCUIT FOR THE IMPROVED USE OF CAPACITANCE IN AN INTERMEDIATE CIRCUIT

(71) Applicants: Robert Bosch GmbH, Stuttgart (DE); Samsung SDI Co., Ltd., Yongin-si, Gyeonggi-do (KR)

(72) Inventor: Stefan Butzmann, Schalksmühle (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 391 days.

(21) Appl. No.: 14/891,684

(22) PCT Filed: May 9, 2014

(86) PCT No.: PCT/EP2014/059508
§ 371 (c)(1),
(2) Date: Nov. 17, 2015

(87) PCT Pub. No.: WO2014/184096
PCT Pub. Date: Nov. 20, 2014

(65) Prior Publication Data
US 2016/0099662 A1    Apr. 7, 2016

(30) Foreign Application Priority Data
May 17, 2013 (DE) .................. 10 2013 209 185

(51) Int. Cl.
*H02J 1/02* (2006.01)
*H02M 1/15* (2006.01)
(Continued)

(52) U.S. Cl.
CPC ............. *H02M 7/537* (2013.01); *B60L 50/51* (2019.02); *H02M 1/15* (2013.01); *H02M 5/297* (2013.01);
(Continued)

(58) Field of Classification Search
CPC ........ H02M 7/537; H02M 1/15; H02M 5/297; H02M 5/45; H02M 2005/2932; B60L 11/1803; H02J 1/02; Y02T 10/7005
See application file for complete search history.

(56) References Cited

U.S. PATENT DOCUMENTS 5,218,520 A   6/1993   Rozman et al.
5,329,222 A   7/1994   Gyugyi et al.
(Continued)

FOREIGN PATENT DOCUMENTS

CN    101752871 A    6/2010
CN    102197580 A    9/2011
(Continued)

OTHER PUBLICATIONS

International Search Report corresponding to PCT Application No. PCT/EP2014/059508, dated Apr. 10, 2015 (German and English language document) (6 pages).

*Primary Examiner* — Jared Fureman
*Assistant Examiner* — Emmanuel Dominique
(74) *Attorney, Agent, or Firm* — Maginot, Moore & Beck LLP

(57) ABSTRACT

The disclosure relates to a method and a circuit for the improved use of a capacitance in an intermediate circuit. According to the disclosure, a change in a voltage in an intermediate circuit is detected and electrical energy is actively provided depending on the change in the electrical variable in order to compensate the change. According to the disclosure, a capacitance used in the intermediate circuit can end up significantly smaller if the electrical energy fed in is used, in that the voltage of the capacitance is supported by a current fed into the capacitance on the earth side.

10 Claims, 5 Drawing Sheets

(51) Int. Cl.
*H02M 7/537* (2006.01)
*H02M 5/45* (2006.01)
*H02M 5/297* (2006.01)
*B60L 50/51* (2019.01)
*H02M 5/293* (2006.01)

(52) U.S. Cl.
CPC ...... *H02M 5/45* (2013.01); *H02M 2005/2932* (2013.01); *Y02T 10/7005* (2013.01)

(56) References Cited

U.S. PATENT DOCUMENTS

| | | | | |
|---|---|---|---|---|
| 8,542,502 | B2* | 9/2013 | Kono | H02M 7/53875 363/34 |
| 2002/0140405 | A1* | 10/2002 | Malik | B60K 6/48 320/166 |
| 2010/0134943 | A1* | 6/2010 | Daehler | H02M 1/143 361/113 |
| 2010/0181979 | A1* | 7/2010 | Abe | H02M 3/07 323/282 |
| 2012/0007428 | A1* | 1/2012 | Rozman | H02J 3/36 307/66 |
| 2012/0013317 | A1* | 1/2012 | Morino | G05F 1/565 323/280 |
| 2015/0333513 | A1* | 11/2015 | Yamada | H02M 3/158 307/46 |

FOREIGN PATENT DOCUMENTS

| | | |
|---|---|---|
| DE | 44 06 402 C1 | 4/1995 |
| DE | 44 41 214 A1 | 5/1996 |
| DE | 10 2005 045 122 A1 | 3/2007 |
| EP | 2 194 629 A1 | 6/2010 |
| WO | 2013/004019 A1 | 1/2013 |

\* cited by examiner

METHOD AND CIRCUIT FOR THE IMPROVED USE OF CAPACITANCE IN AN INTERMEDIATE CIRCUIT

This application is a 35 U.S.C. § 371 National Stage Application of PCT/EP2014/059508, filed on May 9, 2014, which claims the benefit of priority to Serial No. DE 10 2013 209 185.0, filed on May 17, 2013 in Germany, the disclosures of which are incorporated herein by reference in their entirety.

BACKGROUND

The present disclosure relates to a method and to a circuit for the improved use of a capacitance in an intermediate circuit. In particular, the present disclosure relates to intermediate circuits for on-board automobile energy systems in which voltage ripples can occur on a line between an energy store and an inverter at the engine.

The increased electrification of the individual traffic has led to the fact that in electrically drivable vehicles, distinctly higher voltages occur (in the 400 V range and higher) and must be processed, than have occurred in on-board vehicle systems until a few years ago. Whilst energy is stored as direct voltage in a (mostly electrochemical) energy store, an inverter is mostly used (direct-voltage/alternating-voltage converter) for supplying the electrical motor (or generator) with (three-phase) alternating voltage or transferring alternating voltage from the (generator-driven) motor into the electrochemical energy store. By means of the inverter, which frequently comprises AC/DC converters, a disturbance is superimposed on the on-board system voltage in the form of an alternating voltage which can lead to disturbances in the on-board system and to problems of electromagnetic compatibility (EMC). In order to attenuate the disturbance generated by the inverter, a so-called intermediate circuit capacitance is frequently provided between the energy store and the inverter which, when an increased voltage is present, receives energy, and thus "cushions" the voltage peak and, in the case of a voltage dip, delivers electrical energy and thus "boosts" the on-board system. Such a system is shown in FIG. 1. A battery 200 is connected via a so-called contactor 201, 202 to an inverter 203. An intermediate circuit capacitance C0 is connected in parallel with the input of the inverter 203 and the battery 200. The inverter 203 converts the high-voltage direct voltage into a three-phase alternating voltage with which an electric motor 204 is supplied. The intermediate circuit capacitor C0 has the task of attenuating the alternating-voltage components caused by the inverter on the direct-voltage side of the inverter. In the area of the automobile drive technology, such a capacitor usually has a capacitance of 0.5 to 1.5 mF and is very large and costly because of the required dielectric strength of over 400 V.

Furthermore, an active circuit for providing a predefined input impedance according to FIG. 2 is known in which a first operational amplifier 301 and a second operational amplifier 302, in conjunction with a voltage divider consisting of impedances Z1, Z2, Z3, Z4 and Z5, provide a predefined input impedance $Zin=(Z1 \times Z2 \times Z3)/(Z2 \times Z4)$. Since the operation and action of the circuit shown in FIG. 2 is known to the expert, they will not be discussed in further detail.

It is an object of the present disclosure to reduce the costs and the size and the weight of a component used as intermediate circuit capacitance.

SUMMARY

According to the disclosure, it is proposed to dynamically enlarge the intermediate circuit capacitor by active circuitry. This allows a capacitor of lesser size to be used and thus considerable space and cost saving, the effect on the voltage ripple on the direct-voltage on-board system remaining the same. According to the disclosure, a method for the improved use of a capacitance in an intermediate circuit is proposed for this purpose which has the features according to claim 1. In the text which follows, a component providing a capacitance (e.g. capacitor) or such an assembly is designated as capacitance, the capacitance value of which is dynamically enlarged according to the disclosure. In this context, a change of an electric voltage over the capacitance in the intermediate circuit is detected. This can be done, for example, via a high-pass or band-pass filter in order to separate the unwanted voltage ripple components from the high-voltage signal. In this context, the detection is carried out preferably in the area of a high-voltage connection of the capacitance in the intermediate circuit. In the simplest case, this can be a common terminal of the capacitance and an input of the high-pass or band-pass filter. However, according to the disclosure, it should not be excluded that further components are arranged between the capacitance and the detection point. It is only required that the detected quantity is representative of the voltage ripple existing on the direct-voltage on-board system. Furthermore, according to the disclosure, electric energy for compensating for the change in the capacitance is fed in in dependence on the change in the electrical quantity. This can be done, for example, by means of a ground connection of the capacitance. In this manner, the point at which the voltage quantity is detected and the point via which the change is to be compensated for are decoupled from one another by the capacitance. In this context, the feeding-in occurs as an active process in which additional energy is produced in order to support the direct-voltage on-board system in which the capacitance is supplied with energy in the case of a negative ripple voltage and energy is removed from it in the case of a positive ripple voltage. In this manner, the actual magnitude of the capacitance can be less compared with the circuits known in the prior art and, in addition, the voltage ripple can be compensated for in a better manner.

Subclaims provide preferred developments of the disclosure.

As described above, the change in the electric voltage can preferably be produced by a disturbance signal superimposed on a direct-voltage signal, which disturbance signal, in particular, comprises a periodic alternating signal caused by an inverter. In other words, the voltage ripple is caused by switching processes within an inverter which is connected to the intermediate circuit. Such switching processes frequently exhibit harmonic components which can be detected by the circuit according to the disclosure, analyzed and compensated for. In this context, the compensation can be improved particularly in the case of quasistatic processes in that the periodic components of the switching signal are analyzed and subsequently compensated for predictively. In other words, the disturbance signal can be predicted and thus a particularly effective compensation thereof can be performed.

Preferably, the electric variable for compensating for the voltage ripple, fed in during this process, can be generated clocked and/or by mediation of an analog amplification. In other words, during the compensation, a signal can also be generated via switching processes and alternatively or additionally adapted to the voltage swing on the on-board direct-voltage system by means of analog amplification. Since a signal generation with the aid of switching processes provides for extremely low losses and analog amplification is stable and provides for small delays, the economy of the method proposed is increased.

Also preferredly, the detecting of the change comprises high-pass filtering. In this context, a circuit assembly implemented with an additional capacitance and an ohmic resistance connected to ground can be used, for example, which is connected to the high-voltage on-board system at the input end and provides the detection signal required for compensation at the output end. Naturally, the high-pass filtering can also comprise an active circuit assembly and/or digital filters. In this way, a comparatively high direct-voltage component can be kept away from a subsequent evaluation via the high-pass filter. This considerably reduces the necessary dielectric strength of the electric components.

Also preferredly, the detecting of the change can be effected processing the electric signal on the on-board direct-voltage system by means of a microcontroller. For example, the latter can identify periodic components in the voltage signal and precisely dimension a temporal offset of the compensation with respect to the voltage ripple. In this manner, the voltage ripple can be compensated for especially precisely.

According to a second aspect of the present disclosure, a circuit, particularly in an intermediate circuit, for an on-board automobile energy system is proposed. In this context, the circuit is used for improved use of a capacitance in an intermediate circuit as has already been discussed above. For this purpose, the circuit has a high-voltage connection and a ground connection for connecting a capacitance. It is intended to point out that the presence of a capacitance which is to be provided as intermediate circuit capacitance is not required in order to be included within the scope of the attached claims. In this context, the high-voltage connection is configured to connect the capacitance to be connected in the direction of the direct-voltage on-board system. The ground connection is used for connecting the capacitance to be connected in the direction of the electric ground. In this context, it is naturally not required that the high-voltage connection is actually at the high-voltage potential or the ground connection is at the potential of the electric ground. It is only intended to provide an electric orientation for the relative positioning with respect to the remaining circuit components. In addition, the circuit according to the disclosure has a detection unit for detecting a change in an electric voltage in a first part of the circuit. The first part of the circuit is characterized by the fact that it is allocated to the potential of the on-board direct-voltage system. As is stated further above, an identity of the voltage present at the detection unit and of the high-voltage direct voltage is not mandatorily required. At the most, a signal is to be detected which is suitable for generating a suitable compensation signal. In this context, the detection unit can be designed to be active or passive as also described above. In other words, the detection unit can be designed, for example, of a passive high-pass or band-pass network and alternatively or additionally comprise active circuits such as, e.g. a microcontroller by means of which a digital filter can be implemented. Furthermore, according to the disclosure, a compensation unit is provided in the circuit by means of which an electric disturbance on the on-board direct-voltage system can be compensated for at least proportionally. In this context, the high-voltage connection is arranged between the first part of the circuit and the ground connection. In other words, the first part of the circuit in which the detection unit picks up its input signal is located in the area between the direct-voltage potential and the connection of the capacitance at the high-voltage end. In this context, the first part of the circuit can also comprise the aforementioned boundaries. According to the disclosure, the compensation unit is configured to compensate for the change in the electric disturbance at least proportionally in that it feeds electric energy into the ground connection or removes electric energy from the ground connection, respectively. In this manner, the capacitance in the intermediate circuit is supplied with electric energy via the compensation unit when the detection unit signals a voltage dip in the direct-voltage system and electric energy is removed from the capacitance in the intermediate circuit when the detection unit signals an increased voltage compared with a mean value. This results in an electric circuit which enables a distinctly reduced capacitance (component) to be used so that costs, weight and installation space can be saved compared with the circuits known in the prior art.

Also preferredly, the detection unit has a high-pass filter and, alternatively or additionally, a microcontroller. By means of these elements, passive and/or active assemblies for detecting the disturbance can be implemented as stated above. This offers the advantage that particularly simple detection units can be implemented in the first case and particularly efficient and precise detection units in the second case.

Also preferredly, the compensation unit has a digital amplifier and/or an analog amplifier. Whilst a digital amplifier has a high efficiency in supplying the capacitance with energy, an analog amplifier is stable and provides for little time delay between input and output variable. When both components are combined, the respective advantages can be achieved jointly at the expense of increased expenditure and increased costs.

Also preferredly, the compensation unit has an energy buffer, particularly in the form of a storage capacitor. Alternatively or additionally, an inductance can be used for the energy buffer. By means of this energy buffer, the compensation unit can be configured to buffer electric energy from the intermediate circuit (of the direct voltage) and keep it available for supplying the compensation unit. In this manner, an additional voltage supply for operating the compensation unit is unnecessary.

Also preferredly, the compensation unit has a direct-voltage/direct-voltage (DC/DC) converter which is configured to feed electric energy into the ground connection of the capacitance. Since a DC/DC converter has low losses and can transform voltages of different magnitudes into one another via a switching frequency, a DC/DC converter represents a suitable functional assembly within a compensation unit according to the present disclosure.

BRIEF DESCRIPTION OF THE DRAWINGS

In the text which follows, exemplary embodiments of the disclosure are described in detail with reference to the accompanying drawings, in which.

DETAILED DESCRIPTION

Figure 1:
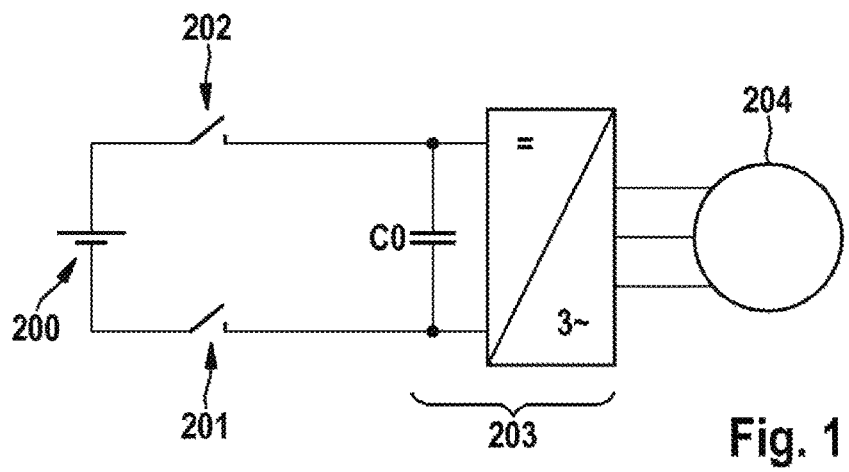
FIG. 1 shows a circuit diagram of a high-voltage on-board system in an electrically drivable vehicle.
Figure 2:
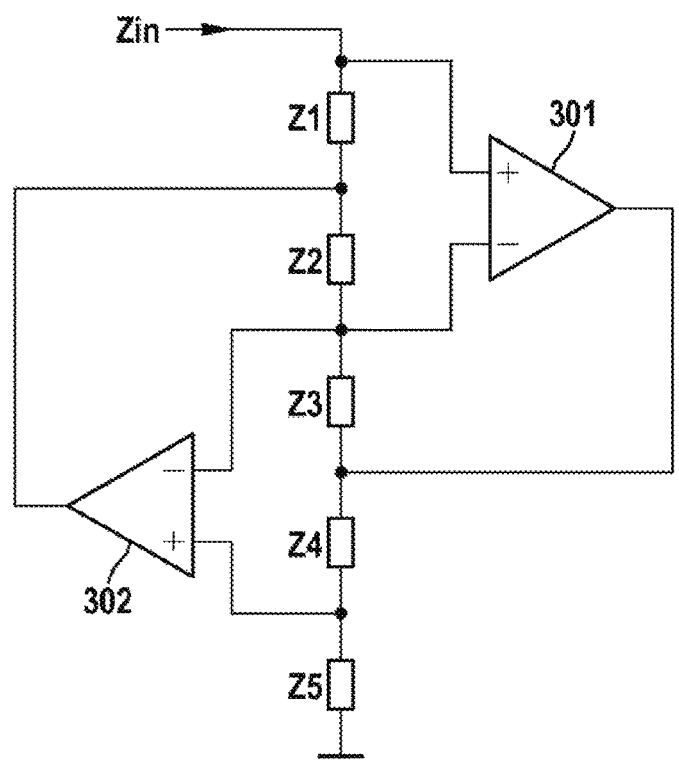
FIG. 2 is an active circuit for implementing a predefined input impedance.
Figure 3:
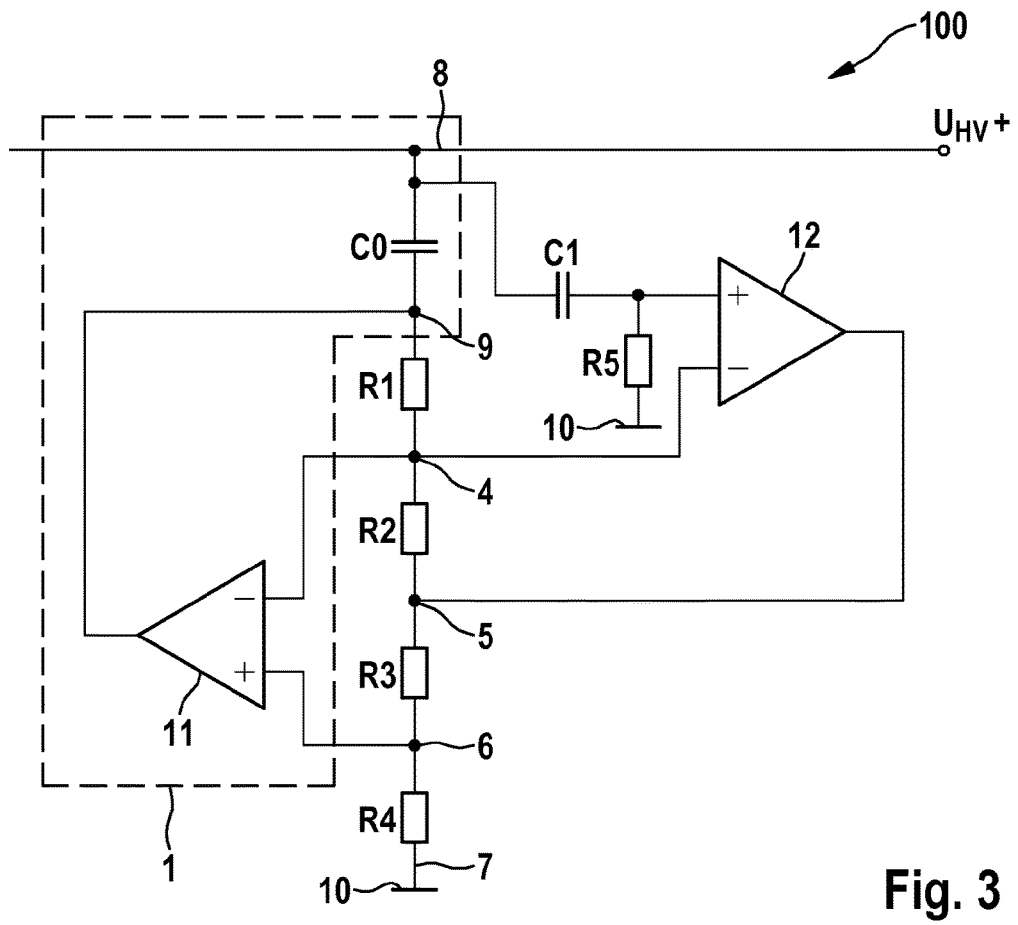
FIG. 3 is a first exemplary embodiment of a circuit according to the present disclosure.

FIG. 3 shows a circuit 100 according to the present disclosure as can be used for smoothing voltage ripple in an on-board high-voltage (HV) direct-voltage system. A connection point 8 coincides with the high-voltage potential UHV+ of the on-board direct-voltage system and with a high-voltage connection of the capacitance C0. At the ground side, a connection point 9 is provided at which a first resistor R1 is connected. On the other side, the resistor R1 is connected to a second resistor R2 at a connection point 4. On the other side, the second resistor R2 is connected to a third resistor R3 at a connection point 5. On the other side, the third resistor R3 is connected to a fourth resistor R4 at a connection point 6. On the other side, the fourth resistor R4 is connected to a connection point 7 which coincides with electrical ground 10. At the connection point 8, a detection unit comprising a capacitor C1 and a fifth resistor R5 connected to ground 10 is provided. Between the capacitor C1 and the fifth resistor R5, a first connection of an operational amplifier 12 is connected. The other connection at the input end of the operational amplifier 12 is connected to the connection point 4 between the first resistor R1 and the second resistor R2. On the output side, the operational amplifier 12 is connected to the connection point 5 between the second resistor R2 and the third resistor R3. As the second operational amplifier 11, which can be designed as power amplifier, it is connected at the input end in each case to the connection point 4 between the first resistor R1 and the second resistor R2 and to the connection point 6 between the third resistor R3 and the fourth resistor R4, respectively. At the output end, the operational amplifier 11 is connected to the ground connection 9 of the capacitance C0. The circuit shown is tuned in such a manner that a dynamic voltage dip at connection point 8 is detected by the detection unit C1, R5, 12 and signaled via the resistor network R1, R2, R3, R4 to the operational amplifier 11, in response to which the latter feeds into the ground connection 9 of the capacitance C0 a current which compensates for the voltage dip. In the case of a voltage rise on the on-board high-voltage system, in contrast, the operational amplifier 11 is caused to remove energy from the capacitance C0 via the ground connection 9. In this way, the range of control of the capacitance C0 is enlarged dynamically, according to the disclosure, and, respectively, the capacitance which is to be measured via the connection point 8, is enlarged.

Figure 4:
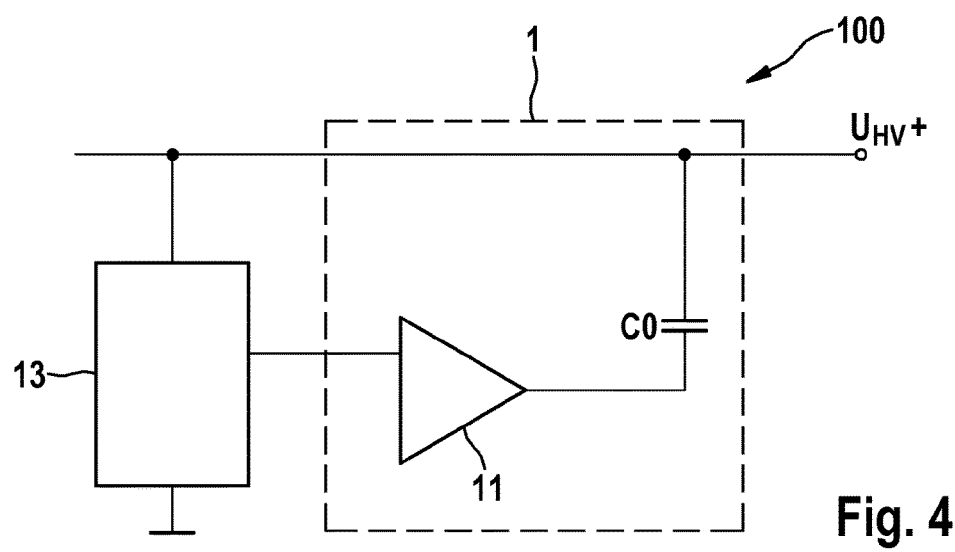
FIG. 4 is a second exemplary embodiment of a circuit according to the present disclosure.

FIG. 4 shows a basic representation of another exemplary embodiment of a circuit 100 according to the present disclosure. In this context, the resistance network shown in FIG. 3 plus detection unit is shown symbolically as signal processor 13. The operational amplifier 11 is driven by the signal processor 13 in such a manner that a voltage dip or a voltage rise in the on-board high-voltage system can be compensated for via the capacitance C0 as described in conjunction with FIG. 3. For a better comparability with FIG. 3, the compensation unit 1, as shown in FIG. 3, consisting of the capacitance C0 and the operational amplifier 11 has a dashed border.

Figure 5:
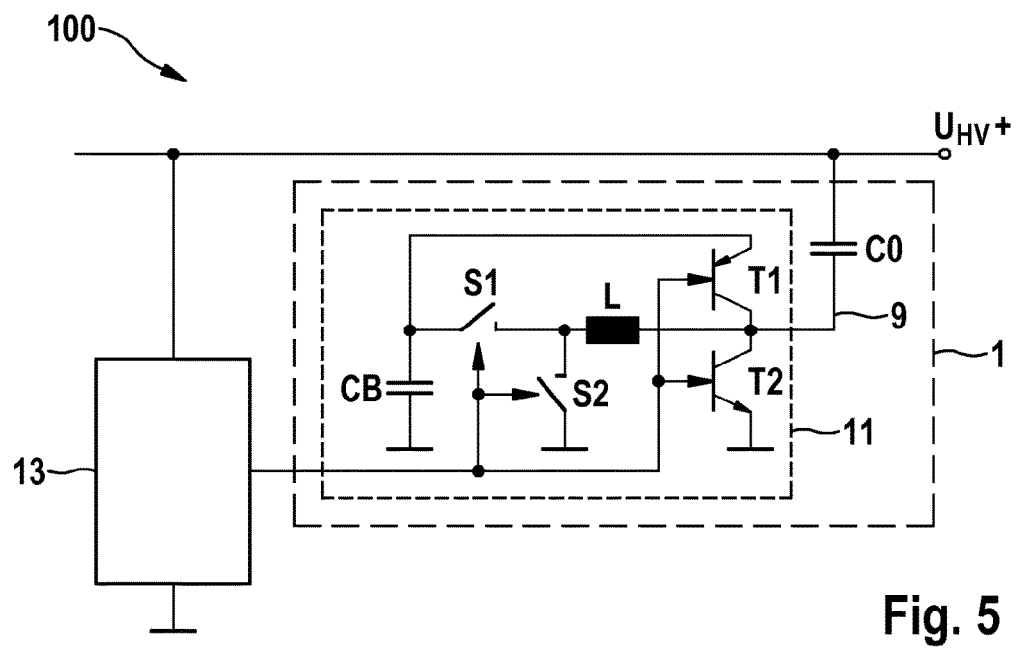
FIG. 5 is a third exemplary embodiment of a circuit according to the present disclosure.

FIG. 5 shows a further exemplary embodiment of a circuit 100 according to the disclosure in which the compensation unit 11 shown in FIG. 4 is equipped more concretely. A block capacitance CB is connected to ground, on one side and, on the other side, to a first switch S1 and to a first connection of a first transistor T1. The first switch S1 is connected to electrical ground on the other side via a second switch S2. The connection point between the first switch S1 and the second switch S2 is connected by an inductance L to the second connection of the first transistor T1. This point is used as output of the compensation unit 11 and, in turn, is connected to electrical ground by a second transistor T2. The signal processor 13 drives the first switch S1, the second switch S2, the first transistor T1 and the second transistor T2. This occurs in such a manner that in the case of a voltage dip on the high-voltage DC system a current is impressed into the ground connection 9 of the capacitance C0 whereas in the case of an overvoltage in the on-board high-voltage system, the capacitance C0 is proportionally discharged via its ground connection 9 and the compensation unit 11. The arrangement shown represents a possible implementation of a hybrid amplifier topology by means of which the advantages of an analog amplifier can be combined with those of a digital amplifier.

Figure 6:
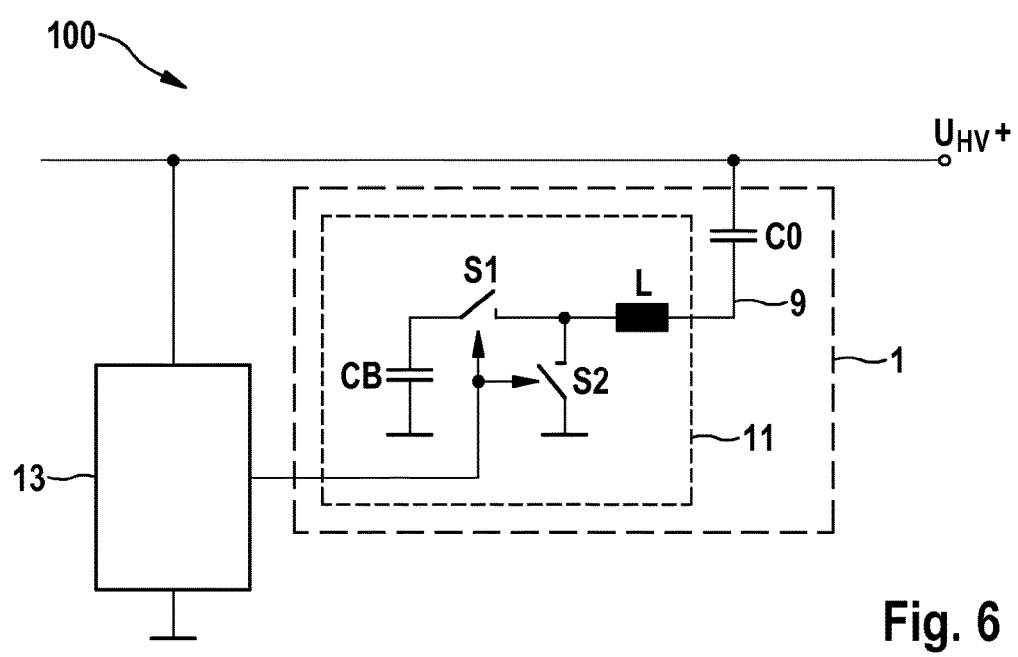
FIG. 6 is a fourth exemplary embodiment of a circuit according to the present disclosure.

FIG. 6 shows an arrangement shown in FIG. 5 in which, however, the transistors T1, T2 were omitted. This simplifies the circuit arrangement and the required control as follows: in the case of an overvoltage on the on-board high-voltage DC system, switch 1 is closed and switch 2 is opened firstly. In this process, the block capacitance CB is charged via the inductance L. If the removal of energy from the capacitance C0 is to be accelerated, switch 1 can be opened and switch 2 can be closed so that the current flow via the inductance L is directed in the direction of electrical ground. By closing the first switch S1 and opening the switch S2, energy stored in the inductance L can now be transferred to the block capacitor CB. Closing the first switch S1 "conserves" the charge stored in the block capacitor CB. The aforementioned switching processes are coordinated by the signal processor 13.

Figure 7:
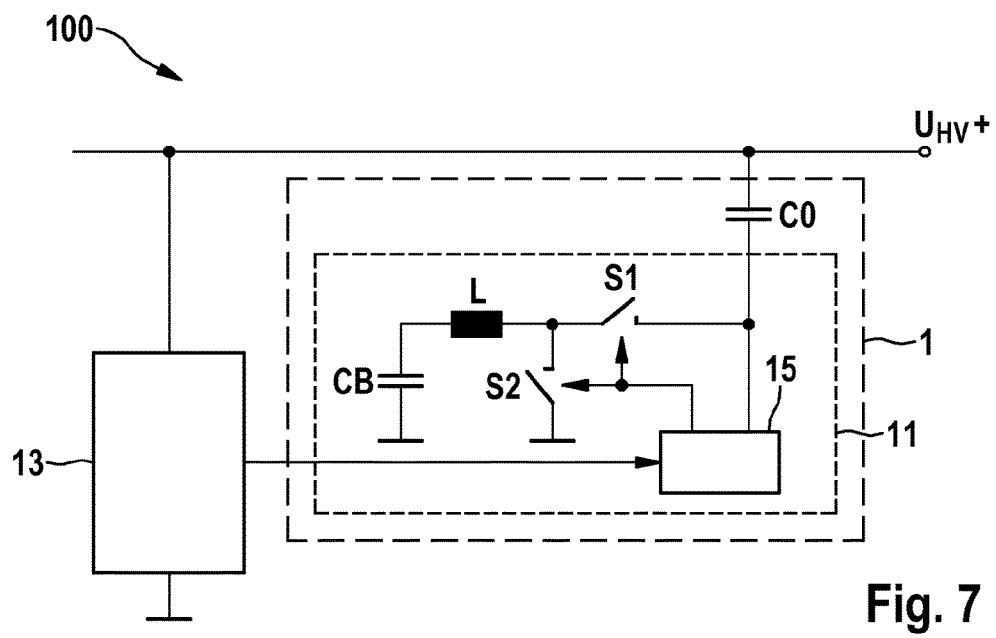
FIG. 7 is a fifth exemplary embodiment of a circuit according to the present disclosure.

FIG. 7 shows a further exemplary embodiment of a circuit 100 according to the disclosure, in which, compared with the arrangement shown in FIG. 6, the signal processor 13 drives a controller 15 contained in the compensation unit 11. The controller 15 thus receives as input variable a signal of the signal processing unit 13 and an electrical input variable from the ground connection of the capacitance C0. The controller 15, in turn, is configured to drive the first switch S1 and the second switch S2 in such a manner that electrical energy stored in the block capacitance CB and the inductance L can be used for boosting the on-board high-voltage system via the capacitance C0. In this context, the DC/DC converter of the compensation unit shown operates in buck mode if energy is to be taken from the on-board system (or the capacitance C0, respectively) and in boost mode if energy is to be supplied to the on-board high-voltage system (or the capacitance C0, respectively). In this context, the capacitor C0 mainly has the task of keeping the duty cycle of the DC/DC converter within a sensible range so that the switching losses do not rise disproportionally.

Figure 8:
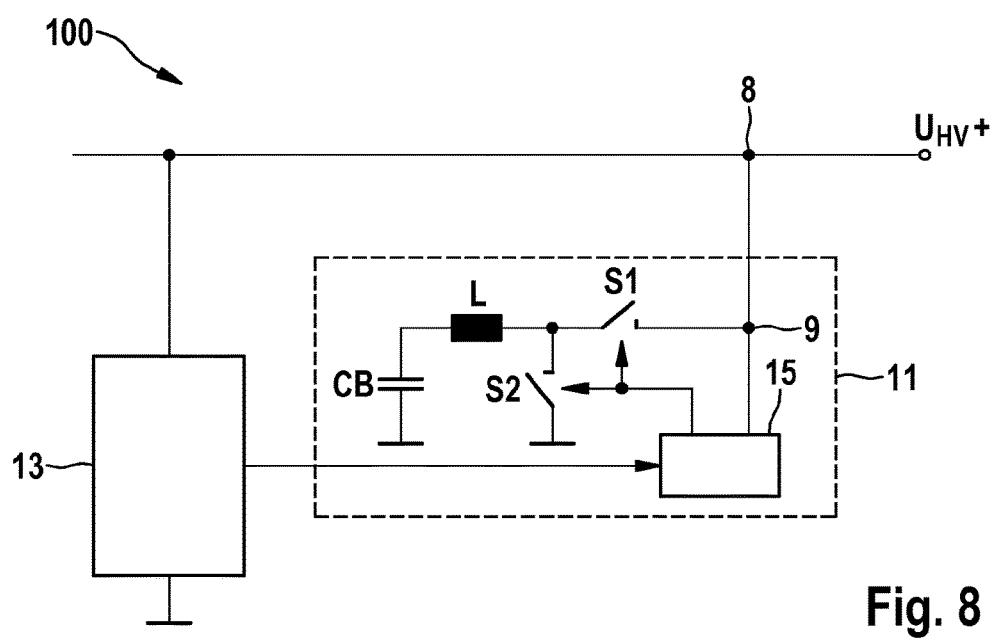
FIG. 8 is a sixth exemplary embodiment of a circuit according to the present disclosure.

FIG. 8 shows a further circuit according to an exemplary embodiment of the present disclosure. According to this exemplary embodiment, the high-voltage connection 8 and the ground connection 9 are connected to one another directly (i.e. without capacitor C0). In this manner, the output of the DC/DC converter (consisting of the block capacitance CB, the inductance L and the first switch S1 and the second switch S2) is connected directly to the on-board high-voltage system. In this circuit, the DC/DC converter must operate with an extremely high duty cycle because of the high voltage drop across the block capacitance CB. Control is, therefore, distinctly more problematic compared with the aforementioned exemplary embodiments.

Figure 9:
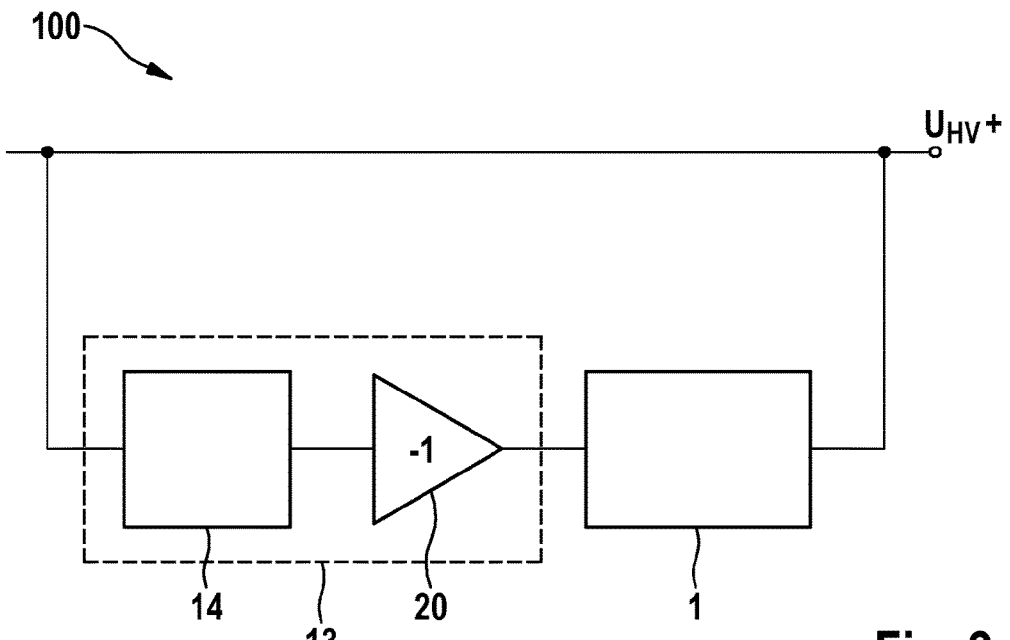
FIG. 9 is a seventh exemplary embodiment of a circuit according to the present disclosure.

FIG. 9 shows a last exemplary embodiment of a circuit 100 according to the present disclosure in which the detection unit 13 has a high-pass filter 14 and an inverter 20. The output of the inverter is connected to a compensation unit 1 shown diagrammatically. In this arrangement, the disturbances on the high-voltage on-board system are filtered by the high-pass filter 14 and inverted via the inverter 20. The compensation unit receives the output signal of the inverter as correcting variable. A power electronic controller (not shown) within the compensation unit 1 is used for compensation. This contains a power amplifier or an assembly as has been presented as compensation unit 1 in conjunction with one of the aforementioned exemplary embodiments. Alternatively, the signal processing unit 11 shown can also be implemented by a correspondingly programmed microcontroller. The operation and advantages are obtained in accordance with the aforementioned exemplary embodiments.

Figure 10:
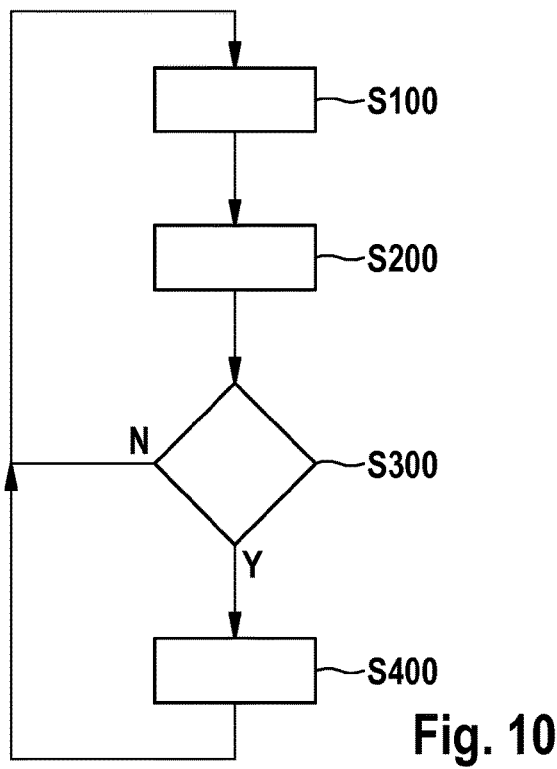
FIG. 10 is a flow chart depicting steps of a method according to an exemplary embodiment of the present disclosure.

FIG. 10 shows a flow chart depicting steps of an exemplary embodiment for a method according to the disclosure. In step S100, a signal on the on-board high-voltage DC system of an electrically drivable means of transportation is high-pass filtered and subsequently compared with a reference variable (e.g. a mean value of the disturbance) (step S200). In step S300, it is decided whether the signal detected deviates from the reference variable. If this is not the case ("N"), the method continues with performing the aforementioned step S100. If, however, the variable determined deviates from the reference variable ("Y"), a variable for compensating for the deviation is output in step S400 in dependence on the deviation determined. If the variable determined exceeds the reference variable, energy is removed from the on-board high-voltage system. If the variable determined is below the reference variable, electrical energy is supplied to the high-voltage on-board system. Both can be done, for example, with the mediation of an intermediate-circuit capacitor as is described above by means of different exemplary embodiments.

It is a core concept of the present disclosure to compensate for voltage ripple on an electrical on-board high-voltage system in that a disturbance in the on-board direct-voltage high-voltage system is detected and energy for boosting the voltage in the on-board direct-voltage high-voltage system is supplied to the latter actively in dependence on a deviation from a reference value. This can be performed, for example, by supplying energy on the ground side into a capacitance boosting the on-board direct-voltage high-voltage system by which means the capacitance can be distinctly smaller, lighter and more cost effective compared with passive circuits.

Although the aspects according to the disclosure of the advantageous embodiments have been described in detail by means of the exemplary embodiments explained in conjunction with the attached drawing figures, modifications and combinations of features of the exemplary embodiments shown are possible for the expert without departing from the field of the present disclosure, the scope of which is defined by the attached claims.

The invention claimed is:

1. A method for use of a capacitance in an intermediate circuit, the capacitance being connected in parallel with an inverter between a DC voltage connection and a ground connection, the method comprising:
   charging the capacitance via an energy source connected to the DC voltage connection;
   detecting a voltage dip in a voltage across the capacitance in the intermediate circuit; and
   compensating for the voltage dip in the voltage by feeding electrical energy proportional to the voltage dip into a ground connection of the capacitance with a compensation unit, in response to detecting the voltage dip, the compensation unit having an energy buffer configured to store electric energy from the intermediate circuit and supply at least some of the electric energy that is fed into the ground connection.

2. The method as claimed in claim 1, wherein the voltage dip in the voltage is produced by a disturbance signal superimposed on the DC voltage connection, the disturbance signal comprising a periodic alternating signal caused by the inverter.

3. The method as claimed in claim 1, wherein the electrical energy fed into the capacitance is supplied via at least one of a switching circuit of the compensation unit and an analog amplification circuit of the compensation unit.

4. The method as claimed in claim 1, wherein the detecting of the voltage dip in the voltage comprises detecting the voltage dip in the voltage with high-pass filtering.

5. The method as claimed in claim 1, wherein the detecting of the voltage dip in the voltage comprises processing an electric variable using a microcontroller.

6. A circuit for use of a capacitance in an intermediate circuit of an on-board automobile energy system, the capacitance being connected in parallel with an inverter between a DC voltage connection and a ground connection, the capacitance being charged via an energy source connected to the DC voltage connection, comprising:
   a detection unit configured to detect a voltage dip in a voltage across the capacitance in the intermediate circuit; and
   a compensation unit configured to compensate for the voltage dip in the voltage by feeding electric energy proportional to the voltage dip into the ground connection in response to detecting the voltage dip, the compensation unit having an energy buffer configured to store electric energy from the intermediate circuit and supply at least some of the electric energy that is fed into the ground connection.

7. The circuit as claimed in claim 6, wherein
   the detection unit comprises at least one of a high-pass filter and a microcontroller.

8. The circuit as claimed in claim 6, wherein
   the compensation unit comprises at least one of a digital amplifier and an analog amplifier.

9. The circuit as claimed in claim 6, wherein
   the compensation unit comprises a DC/DC converter configured to feed the electric energy into the ground connection.

10. The circuit as claimed in claim 6, wherein the energy buffer comprises a storage capacitor and an inductance.

* * * * *